United States Patent [19]
Ronden et al.

[11] Patent Number: 5,981,631
[45] Date of Patent: Nov. 9, 1999

[54] PROCESS FOR THE PRODUCTION OF COMPOSITES OF CO-MINGLED THERMOSET RESIN BONDED WOOD WASTE BLENDED WITH THERMOPLASTIC POLYMERS

[75] Inventors: Clifford P. Ronden; Joseph C. Morin, both of Alberta, Canada

[73] Assignee: Wood Composite Technologies Inc., Alberta, Canada

[21] Appl. No.: 08/881,912

[22] Filed: Jun. 25, 1997

Related U.S. Application Data

[60] Provisional application No. 60/021,437, Jul. 9, 1996.

[51] Int. Cl.$^6$ .............................. C08L 1/00; C08L 23/00
[52] U.S. Cl. ............................................. 524/13; 524/274
[58] Field of Search ...................................... 524/13, 274

[56] References Cited

U.S. PATENT DOCUMENTS

| | | | |
|---|---|---|---|
| 3,455,779 | 7/1969 | Showater | 162/179 |
| 3,485,777 | 12/1969 | Gaylord | 260/17.4 |
| 3,645,939 | 2/1972 | Gaylord | 260/17.4 |
| 3,649,580 | 3/1972 | Arlt, Jr. | 260/27 |
| 3,943,079 | 3/1976 | Hamedd | 161/59 |
| 3,956,541 | 5/1976 | Pringle | 428/2 |
| 4,112,152 | 9/1978 | Dolk et al. | 427/385 R |
| 4,209,433 | 6/1980 | Hse | 156/62.2 |
| 4,225,640 | 9/1980 | Erb | 428/2 |
| 4,241,133 | 12/1980 | Lund et al. | 428/326 |
| 4,323,625 | 4/1982 | Coran et al. | 428/361 |
| 4,376,144 | 3/1983 | Goettler | 428/36 |
| 4,381,332 | 4/1983 | Fulmer | 428/288 |
| 4,414,267 | 11/1983 | Coran | 428/288 |
| 4,791,020 | 12/1988 | Kokta | 428/326 |
| 4,870,115 | 9/1989 | Mowdood et al. | 525/236 |
| 5,082,605 | 1/1992 | Brooks et al. | 264/40.6 |
| 5,096,406 | 3/1992 | Brooks et al. | 425/205 |
| 5,151,238 | 9/1992 | Earl et al. | 264/136 |
| 5,473,000 | 12/1995 | Pinomaa | 524/59 |
| 5,480,602 | 1/1996 | Nagaich | 524/13 |
| 5,516,472 | 5/1996 | Laver | 264/118 |
| 5,817,262 | 10/1998 | Englert | 264/86 |

OTHER PUBLICATIONS

Drew, John and Propst, Marshall, Editors, *Tall Oil*, Pulp Chemicals Associated, New York, 1981, pp. 1–9, 79–134.

Gatenholm, P. et al, "Methods for improvement of properties of cellulose–polymer composites," *Wood Fiber/Polymer Composites: Fundamental Concepts, Processes, and Material Options*, Forest Products Society, 1993, pp. 20–24.

Myers, G.E. et al, Wood flour and polypropylene or high–density polyethylene composites: influence of maleated polypropylene concentration and extrusion temperature on properties, *Wood Fiber/ Polymer Composites: Fundamental Concepts, Processes, and Material Options*, Forest Products Society, 1993, pp. 49–56.

Mohanakrishnan, C.K. et al, "Reactive extrusion processing of polypropylene–lignocellulosic blend materials", *Wood Fiber/Polymer Composites: Fundamental Concepts, Processes, and Material Options,* Forest Products Society, 1993, pp. 57–62.

Woodhams, R.T. et al, "Intensive mixing of wood fibers with thermoplastics for injection–molded composites", *Wood Fiber/Polymer Composites: Fundamental Concepts, Processes, and Material Options,* Forest Products Society, 1993, pp. 75–78.

Selke, S.E. et al, "Wood fiber/high–density polyethylene composites: ability of additives to enhance mechanical properties", *Wood Fiber/Polymer Composites: Fundamental Concepts, Processes, and Material Options,* Forest Products Society, 1993, pp. 109–111.

Maldas, D. et al, "Role of coupling agents and treatments on the performance of wood fiber–thermoplastics composites", *Wood Fiber/Polymer Composites: Fundamental Concepts, Processes, and Material Options,* Forest Products Society, 1993, pp. 112–120.

Rowell, R.M. et al, "Results of chemical modification of lignocellulosix fibers for use in composites", *Wood Fiber/ Polymer Composites: Fundamentals Concepts, Processes, and Material Options,* Forest Procducts Society, 1993, pp. 121–127.

Hopkins, R.C., "Glass Spheres as Filler/Reinforcement in Plastic Materials", *PRT 'Polymer Age',* Sep., 1972 at pp. 344–345, 348.

"Glass spheres—high strength fillers for plastics", *europlastics monthly,* Nov. 1973, pp. 60–61.

Rowe, Paul E., "Glass Microballoon® Spheres as a Filter for Plastics", 116th Meeting Papers, ACS Div. of Organic Coating & Plastics Chemistry, Aug. 1973, pp. 67–73.

Jones, G.T. et al, "Fillite Hollow Microspheres in Reinforced Plastics", *European Journal of Cellular Plastics,* Oct. 1979, pp. 163–171.

*Primary Examiner*—Kriellion S. Morgan
*Attorney, Agent, or Firm*—Rodman & Rodman

[57] ABSTRACT

The within invention is directed at a composite material comprising a product of a combination of materials. The combination of materials comprises an organic filler comprised of cellulosic material, a thermoplastic polymer having a melt temperature of less than the char temperature of the organic filler and a coupling agent comprised of at least one fatty acid having at least 16 carbon atoms and at least one rosin acid having at least 16 carbon atoms. The within invention is further directed at a process for producing the composite material comprising the step of combining the organic filler, the thermoplastic polymer and the coupling agent at a temperature of greater than or equal to the melt temperature of the thermoplastic polymer and less than the char temperature of the organic filler.

30 Claims, 4 Drawing Sheets

| THE PRINCIPLES of ADHESION MECHANISMS ||
|---|---|
| ADHESION MECHANISM | SCHEMATIC DESCRIPTION |
| Adsorption and Chemical Bonding |  |
| Diffusion | <br>Polymer A    Polymer B    A + B |
| Electrostatic Attraction |  |
| Mechanical Interlocking | <br>Adhesion Strength → |

PROCESS FOR THE PRODUCTION OF COMPOSITES OF CO-MINGLED THERMOSET RESIN BONDED WOOD WASTE BLENDED WITH THERMOPLASTIC POLYMERS

CROSS-REFERENCE TO RELATED APPLICATION

This application claims the benefit of United States of America Provisional Application No. 60/021,437 filed Jul. 9, 1996.

TECHNICAL FIELD OF THE INVENTION

The present invention relates to a composite material, and a process for preparing the composite, wherein the composite material is a product of a combination of materials comprising an organic filler, a thermoplastic polymer and a coupling agent.

BACKGROUND OF THE INVENTION

Conventionally, composite materials have essentially consisted of either thermosetting or thermoplastic materials having fillers or reinforcing materials dispersed therein. The supply and cheapness of wood fiber on a world-wide basis, as well as its other advantages, has made wood fibers a desirable material for filler/reinforcing in combination with such thermosetting or thermoplastic materials.

Conventional wood composites comprised of wood fibers and thermosetting polymers, such as plywood and fiber board, which are offered on the market today tend to suffer from low moisture resistance due to the hydrophilic nature of the wood. For this reason, amongst others, during the last several years, interest has grown in the combination of wood fibers with thermoplastic matrices for the production of composite materials, particularly for low cost/high volume applications. Using a thermoplastic polymer in the composite has been found to result in an improvement in the water resistance and other properties of the composite material.

Further, the development of wood fiber and thermoplastic composites has occurred because wood-derived fillers or reinforcement for thermoplastic polymers may have several further advantages. For instance, the use of wood fibers as filler and reinforcement for thermoplastics may result in a composite material having a lower cost to produce, a lower density, a greater Romulus (which results in lower filler damage during processing), and less abrasiveness to processing equipment as compared to other fillers or reinforcing materials on the market for thermoplastics. In addition, wood fiber fillers are derived from a renewable resource.

However, the use of wood fibers in combination with thermoplastics has been limited mainly as a result of difficulties experienced in dispersing the hydrophilic wood fibers in the hydrophobic thermoplastic polymer matrix. In addition, as a result of the hydrophilic nature of the wood fibers and the hydrophobic nature of the thermoplastic, there appears to be a weak interaction therebetween. Insufficient dispersion and weak interactions may result in poor adhesion (wettability and particle-bonding), and in consequence, inferior mechanical properties in the resultant composite materials.

More particularly, because the wood filler is insoluble in the thermoplastic polymer matrix, a polymer matrix interface is created. The interface/interphase region strongly affects the end properties of the composite material. The interface is the surface between the two phases, whilst the interphase is defined as the region between the wood and the thermoplastic polymer matrix. Poor interaction between the wood and the polymer matrix decreases the interfaces between the phases.

Several approaches have been developed for improving the compatibility of the wood fibers and the thermoplastic polymer matrix. More particularly, emphasis has been placed on improving the interfacial adhesion between the hydrophilic wood particles and the hydrophobic thermoplastic polymer matrix. Two primary approaches have been used: (1) modification of the wood surface before processing; and (2) use of a compatibility or coupling agent during compounding.

Many different approaches are reported in the literature for surface treatment of the wood, for example, coating and grafting of the wood fibers. The basic method employed is to chemically modify the wood filler component prior to compounding.

With respect to the use of compatibility agents, referred to in the industry as coupling agents, it has been determined that the adhesion between the wood fibers and the synthetic polymer can be improved when the coupling agent is added during processing. Coupling agents may act to modify the interface between the wood fibers and the thermoplastic polymer by interacting therewith and forming a link or bond between the components. Thus, the use of coupling agents may enhance the inherently poor attraction between the polar wood and the non-polar thermoplastic component.

The "coupling agents" previously used in the industry cover a broad range of complex polymers, such as: maleic anhydride polyethylene (MAPE)/polypropylene (MAPP); styrene-butadiene-styrene; carboxylic wax; ionomer modified polyethylene; and low molecular weight polypropylene. However, these types of coupling agents may be expensive to use or difficult to disperse within a matrix mixture.

There is therefore a need in the industry for a composite material comprised of relatively low cost components and exhibiting comparable or improved properties as compared to known composites in the market. More particularly, there is a need for an improved composite material comprised of an organic filler and a thermoplastic polymer. There is also a need for a relatively cost effective coupling agent for use in the improved composite material to enhance the properties thereof. There is also a need for a process for producing the composite material.

SUMMARY OF THE INVENTION

The within invention relates to a composite material comprising a product of a combination of materials and a process for producing the same. The combination of materials comprises an organic filler, a thermoplastic polymer and a coupling agent. Preferably, the combination of materials are relatively low cost and the composite material exhibits comparable or improved properties as compared to known composites in the market. Further, the within invention relates to a relatively cost effective coupling agent for enhancing the properties of the composite material.

More particularly, in the preferred embodiment, the within invention relates to the production of a new composite material using a co-mingled mixture of wood fibers and a thermoset binding polymer in a matrix of a thermoplastic polymer. The bonding or adhesion of the components, and the distribution of the components throughout the composite, are aided by a coupling agent. The coupling agent is comprised of at least one high molecular weight fatty acid and at least one high molecular weight rosin acid.

Preferably, the coupling agent is comprised of tall oil. The coupling agent is believed to improve dispersion of the wood fibers into the thermoplastic polymers improve the processing and other properties of the composite material.

In a first aspect of the invention, the invention is comprised of a composite material comprising a product of a combination of materials. The combination of materials comprises: an organic filler comprised of cellulosic material; a thermoplastic polymer having a melt temperature of less than the char temperature of the organic filler; and a coupling agent comprised of at least one fatty acid having at least 16 carbon atoms and at least one rosin acid having at least 16 carbon atoms.

In a second aspect of the invention, the invention is comprised of a process for producing a composite material. The process is comprised of the step of combining an organic filler comprised of cellulosic material, a thermoplastic polymer having a melt temperature of less than the char temperature of the organic filler and a coupling agent comprised of at least one fatty acid having at least 16 carbon atoms and at least one rosin acid having at least 16 carbon atoms, wherein the combining step is performed at a temperature of greater than or equal to the melt temperature of the thermoplastic polymer and less than the char temperature of the organic filler.

In the first and second aspects of the invention, the coupling agent may be comprised of any suitable percentages by weight of the fatty acids and rosin acids capable of performing the function of the coupling agent. However, preferably, the coupling agent is comprised of between about 10 to 55 percent by weight of the fatty acids and of between about 5 to 50 percent by weight of the rosin acids. In the preferred embodiment, the coupling agent is comprised of between about 35 to 55 percent by weight of the fatty acids and of between about 25 to 50 percent by weight of the rosin acids.

Further, the coupling agent may be comprised of any percentage by weight of unsaponifiables which does not significantly interfere with the functioning of the coupling agent. However, preferably, the coupling agent is comprised of less than about 40 percent by weight of unsaponifiables. In the preferred embodiment, the coupling agent is comprised of less than about 20 percent by weight of unsaponifiables.

Preferably, the coupling agent is comprised of a tall oil. The tall oil may be naturally or synthetically produced. In the preferred embodiment, the tall oil is a depitched tall oil.

Further, in the first and second aspects, the organic filler may be comprised of any suitable cellulosic material capable of performing the function of the filler and reinforcing the composite material such that the composite material exhibits the desired properties. For instance, the organic filler may be comprised of wood fibers. However, in the preferred embodiment, the organic filler is comprised of co-mingled wood fibers and a thermoset binding polymer.

The organic filler may have any suitable particle size or moisture content compatible with the desired properties of the composite material and the process for producing it. Preferably, the organic filler has a particle size of less than or equal to about United States of America standard sieve size 40 mesh. Further, the moisture content of the organic filler is preferably between about 2 and 6 percent by weight.

Any suitable thermoplastic polymer having a melt temperature less than the char temperature of the organic filler may be used to produce the composite material. However, preferably, the thermoplastic polymer is comprised of a polyolefin having a melt temperature of less than about 390 degrees Fahrenheit. In the preferred embodiment, the polyolefin is selected from the group consisting of polyethylene, polypropylene and polyvinyl chloride.

Further, in the first aspect of the invention relating to the composite material, any amount of the coupling agent able to perform the purpose or function of the coupling agent and to achieve the desired properties of the composite material may comprise the combination of materials. However, the combination of materials is preferably comprised of the coupling agent in an amount of between about 0.5 to 10 percent by weight of the organic filler. In the preferred embodiment, the combination of materials is comprised of the coupling agent in an amount of between about 0.5 to 5 percent by weight of the organic filler.

As well, in the first aspect, any amount of the organic filler capable of performing the function of the filler and reinforcing the composite material such that the composite material exhibits the desired properties may be used. Preferably, the organic filler comprises between about 10 and 80 percent by weight of the composite material. Further, in the preferred embodiment, the organic filler comprises between about 25 and 70 percent by weight of the composite material.

Finally, in the first aspect, any amount of thermoplastic material capable of performing the function of the thermoplastic polymer such that the composite material exhibits the desired properties may be used. However, preferably, the thermoplastic polymer comprises between about 30 and 75 percent by weight of the composite material.

In the second aspect of the invention relating to the process for producing the composite material, the combining step is preferably comprised of the steps of: first mixing the organic filler with the coupling agent such that the coupling agent substantially wets the organic filler to produce a wetted filler; and second mixing the thermoplastic polymer with the wetted filler such that the thermoplastic polymer is substantially homogeneously blended with the wetted filler to produce the composite material.

The first mixing step may be comprised of mixing any amount of the coupling agent able to perform the purpose or function of the coupling agent and to achieve the desired properties of the composite material. Preferably, the first mixing step is comprised of mixing an amount of the coupling agent of between about 0.5 to 10 percent by weight of the filler. In the preferred embodiment, the first mixing step is comprised of mixing an amount of the coupling agent of between about 0.5 to 5 percent by weight of the filler.

Further, in the second aspect, the first mixing step may be comprised of mixing any amount of the organic filler capable of performing the function of the filler and reinforcing the composite material such that the composite material exhibits the desired properties. Preferably, the first mixing step is comprised of mixing an amount of the organic filler of between about 10 and 80 percent by weight of the composite material. In the preferred embodiment, the first mixing step is comprised of mixing an amount of the organic filler of between about 25 and 70 percent by weight of the composite material.

The second mixing step, in the second aspect of the invention, may be comprised of mixing any amount of the thermoplastic polymer capable of performing the function of the thermoplastic polymer such that the composite material exhibits the desired properties. In the preferred embodiment, the second mixing step is comprised of mixing an amount of the thermoplastic polymer of between about 30 and 75 percent by weight of the composite material.

Finally, in the second aspect, the process is preferably further comprised of the step of extruding the composite material at a temperature of less than 390 degrees Fahrenheit.

BRIEF DESCRIPTION OF THE DRAWINGS

Embodiments of the invention will now be described with reference to the accompanying drawings, in which.

DETAILED DESCRIPTION

Figure 1:
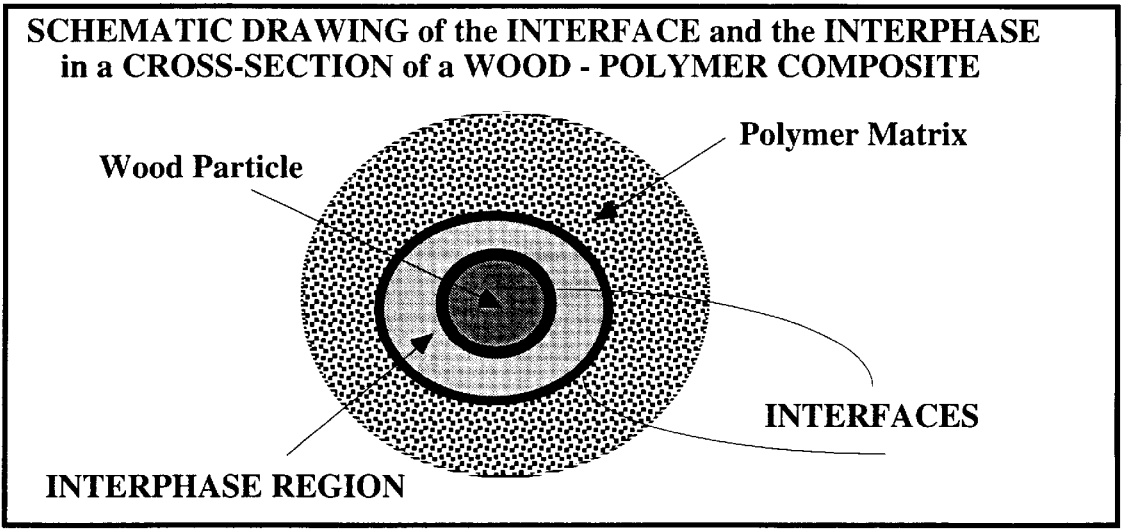
FIG. 1 is a schematic illustration of the interaction mechanisms of the filler/thermoplastic polymer composite material of the within invention.

The within invention is directed at a composite material and a process for producing such composite material. The composite material comprises a product of a combination of materials. The combination of materials comprises an organic filler, a thermoplastic polymer and a coupling agent. Because the organic filler is insoluble in the thermoplastic polymer, a polymer matrix interface is created. It is known that the interface/interphase region strongly affects the end properties of the composite material. The interface is the surface between the two phases, whilst the interphase is defined as the region between the organic filler and the thermoplastic polymer. Referring to FIG. 1, two interfaces are present in the composite material - one between the interphase and the organic filler particle and another between the interphase and the thermoplastic polymer matrix.

The organic filler is comprised of a naturally hydrophilic or polar material, while the thermoplastic polymer is comprised of a naturally hydrophobic or non-polar material. The coupling agent is believed to modify the interface between the organic filler fibers and the thermoplastic polymer in order to enhance the interfacial adhesion therebetween.

Figure 2:
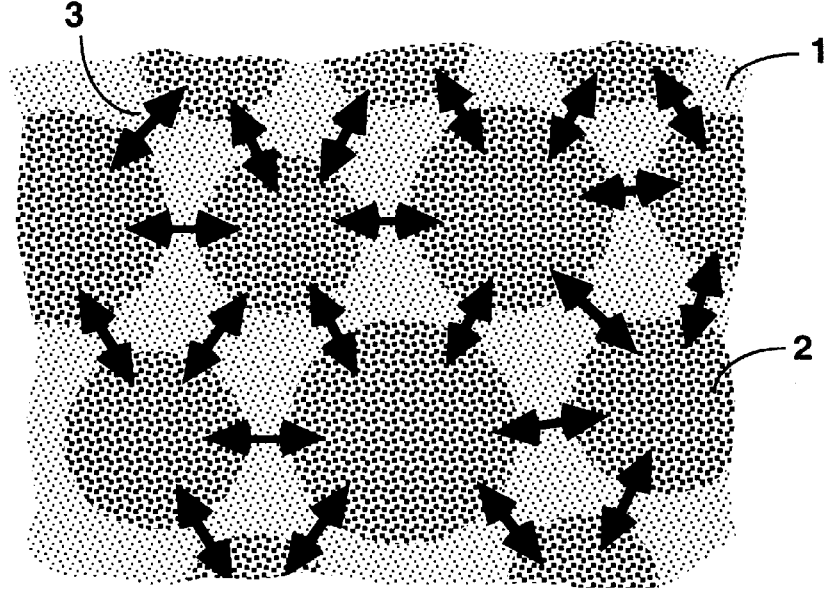
FIG. 2 is a schematic illustration of the filler particle-thermoplastic polymer bonding phenomena of the composite material of the within invention.

Although the specific mechanism of action of the coupling agent is not fully known, it is believed that FIG. 2 represents a schematic illustration of the bonding phenomena (3) occurring between the organic filler particles (2) and the thermoplastic polymer (1) as a result of the presence of the coupling agent to form the composite material of the within invention. As a result, adhesion occurs between the adjacent surfaces of the organic filler particle and the thermoplastic polymer. Adhesion is defined as the adhering together of two surfaces so that the stresses can be transmitted between the phases and thereby quantify the work energy required to separate the two phases.

Figure 3:
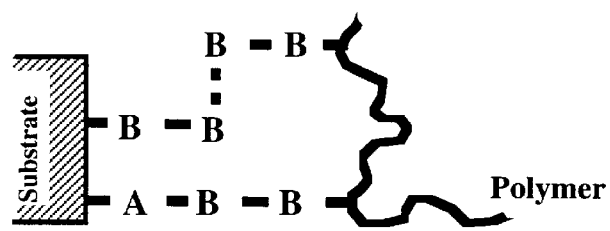
FIG. 3 is a schematic illustration of the principles of adhesion mechanisms between the filler particles and the thermoplastic polymer of the within invention.
Figure 3:
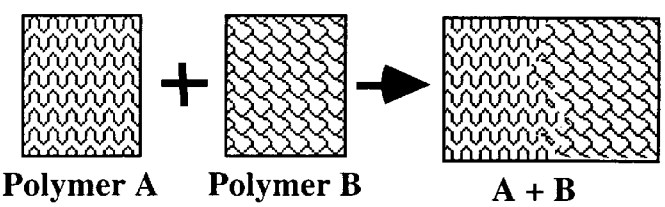
Figure 3:
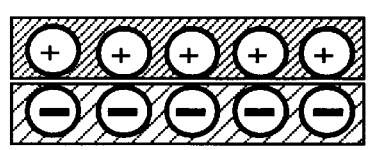
Figure 3:
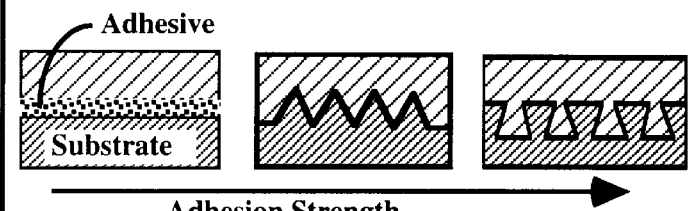

The specific mechanism for the adhesion between the surfaces is believed to be a result of adsorption, chemical bonding and/or diffusion at the molecular level and electrostatic attraction and/or mechanical interlocking at the micro level. FIG. 3 provides a schematic illustration of each of these adhesion mechanisms.

The organic filler may be comprised of any organic filler material capable of reinforcing the composite material, such that the composite material exhibits the desired properties, and compatible with the process for producing the composite material, as described herein. However, preferably, the organic filler is comprised of a cellulosic material.

Any cellulosic material may be used which is suitable for, and compatible with, its use in a filler-thermoplastic polymer composite and which is capable of performing the purpose or function of the organic filler, as described herein, and thus contributing to the desired properties of the composite material. Particularly, the cellulosic material provides filler and reinforcement to the composite material. Further, the cellulosic material must be compatible with the thermoplastic polymer to be used in the composite material and compatible with the intended process for producing the composite material including the parameters or operating conditions of such process. For instance, the cellulosic material must be capable of withstanding, without significant damage thereto, the physical action or stresses of the process as well as the temperatures required to melt the thermoplastic polymer and achieve a workable composite In the preferred embodiment, the cellulosic material is comprised of wood fibers or particles of a desired particle size. The wood fibers may be untreated, but are preferably treated. Untreated wood fibers have not undergone any chemical processing or treatment or mixing with any other substances such that the natural properties of the wood fibers are unchanged. For instance, the untreated wood fibers may be comprised of sawdust. The sawdust may be derived from any single hardwood or softwood or a combination thereof, but is preferably pine, spruce, fir, poplar, alder, cedar or a mixture thereof.

As stated, in the preferred embodiment, the organic filler is comprised of treated wood fibers. Treated wood fiber is comprised of co-mingled wood fiber of a desired particle size and a thermoset binding polymer. It has been found that the use of treated wood fibers, as compared to untreated wood fibers, in the within invention may improve or enhance the further subsequent bonding or adhesion of the filler with the thermoplastic polymer to produce the new composite material.

The wood fiber component of the treated wood fibers may be derived from any single hardwood or softwood or a combination thereof, but is preferably pine, spruce, fir, poplar, alder, cedar or a mixture thereof. Any thermoset binding polymer, compatible for use with the selected wood fiber component, may be used singularly or in combination with other thermoset binding polymers. For instance, the thermoset binding polymer may be comprised of phenol formaldehyde, urea formaldehyde, polyisocyanates or combinations thereof. Typically, the thermoset binding polymer is used to improve or enhance the adhesive strength of the wood fiber component and to improve or enhance resistance to delamination from moisture pickup. Furthermore, the thermosetting polymers may also provide improved wetting of the wood fiber component particles.

Preferably, the treated wood fibers, being the co-mingled mixture of wood fibers and thermoset polymer binding, is obtained from waste products. The use of waste co-mingled wood fiber-thermoset bonded material may be particularly advantageous given the low cost of the waste material and given that its use may contribute to a solution for a significant waste disposal problem for the industry. Waste co-mingled wood fiber-thermoset bonded material may be derived from the off-cuts and manufacturing scrap resultant from production of plywood, oriented strand board, medium density fiber board, particle board production or the like and end-use surplus sources.

The precise form of the waste wood fiber-thermoset binder and the specific composition of these products will differ according to the source and the manufacturer. For instance, the thermoset polymer content used in board production may vary from about 3 to 10% by weight for the formaldehyde group of thermoset polymers, and is typically in the range of about 3 to 5% by weight, while the polyisocyanates may vary from about 1 to 6% by weight, and is typically about 2 to 4% by weight.

To prepare the organic filler for use in the preferred embodiment of the invention, the treated wood fiber particles are preferably ground and classified to obtain the desired particle size distribution and desired aspect ratios. The desired particle size distribution and the desired aspect ratios will vary depending upon the desired properties of the resultant composite material and the intended manner of processing the composite material. A typical particle size distribution for treated pine wood fiber filler is shown in Table No. 1. Typical generic pine wood fiber properties are shown in Table No. 2.

TABLE NO. 1

SPECIFICATIONS - TYPICAL PINE WOOD FIBER FILLER
Particle Size Distribution - Using Alpine Method (% by Weight Retained)
(Preferred)

| U.S. Standard Sieve | Micron Equivalent | Grade 2020 | Grade 4020 | Grade 14020 |
|---|---|---|---|---|
| 10 Mesh | 2000 microns | Trace % | 0% | 0% |
| 20 | 850 | 0–5. | Trace | 0 |
| 40 | 425 | 40.–80. | 0–5. | 0 |
| 60 | 250 | 10.–40. | 45.–85. | 0 |
| 80 | 180 | 0–5. | 10.–40. | 0 |
| 100 | 150 | 0–5. | 0–10. | 0 |
| 120 | 125 | Not Used | 0–10. | Trace |
| 140 | 106 | Not Used | Not Used | 0–5. |
| 200 | 75 | Not Used | Not Used | 5.–15. |
| Balance Retained on Pan | | 0–5. | 0–10. | 85.–95. |

TABLE NO. 2

CHEMICAL AND PHYSICAL PROPERTIES - TYPICAL PINE WOOD

| Description | Units of Measure | Value |
|---|---|---|
| ACIDITY | (pH) | 4.55–4.6 |
| APPARENT DENSITY | (Lbs. per Cu. Ft.) | 8.–16. |
| SPECIFIC GRAVITY | (g per cc) | 0.35–0.50 |
| ASH CONTENT | (% by Weight) | 0.35% |
| MOISTURE CONTENT | (% by Weight) | 5.–7% |
| COLOR | | Light Buff |
| PURITY | | Free from Bark, Dirt, Metal & Other Foreign Matter |
| FLASH POINT | (° F.) | Not Applicable |
| AUTOIGNITION TEMP. | (° F.) | 400–500° F. |
| EXPLOSIVE LIMITS in AIR | | 40 grams/M3 |

Any particle size of the filler and any aspect ratio suitable for, and compatible with, producing the composite material with the desired properties may be used. Further, the desired particle size and aspect ratio may vary depending upon the particular process to be used for the production of the composite material. In other words, the particle size and aspect ratio must also be compatible with the production process.

Preferably, the treated wood fibers have a high aspect ratio of at least about 50. However, it may not be necessary to prepare such high aspect ratio wood-polymer initially. In addition, the treated wood fibers preferably have a particle size distribution of less than or equal to about United States of America Standard Sieve size 40 Mesh. Thus, the particle size is preferably less than or equal to about 425 microns.

As well, the treated wood fiber filler may have any moisture content compatible with achieving the desired properties of the composite material and compatible with the intended manner of processing the composite material. In the preferred embodiment, the moisture content of the organic filler is between about 2 and 6 percent by weight of the organic filler.

The proportion of the organic filler to be used in the present invention to produce the composite material will also vary depending upon a number of factors, including the intended manner of processing the composite material, the desired properties of the composite material and its intended use. However, preferably, the composite material is comprised of between about 10 to 80 percent, by weight, of the organic filler. More preferably, the composite material is comprised of between about 15 to 75 percent by weight of the organic filler. In the preferred embodiment, the composite material is comprised of between about 25 to 70 percent by weight of the organic filler.

From an economics point of view, it is desirable to have as high a proportional content of the organic filler in the composite material as is consistent with achieving desirable strength and other physical properties of the composite material. In the preferred embodiment, the strength and modulus of the resulting new composite have been found to increase with the proportion or percentage of the waste co-mingled wood fiber-thermoset binder filler component, up to about 65 percent by weight of the composite material.

The thermoplastic polymer of the within invention may be comprised of any suitable thermoplastic polymer compatible with its intended use as described herein. As well, in the preferred embodiment, the process for the production of the composite material requires the heating of the various components of the composite during the combining and mixing thereof. Further, in the preferred embodiment, the composite material undergoes further processing by either extrusion or molding, Thus, the thermoplastic polymer must be capable of withstanding the temperatures associated therewith.

In addition, in order to avoid the charring or burning of the filler, the thermoplastic polymer preferably has a melt temperature of less than the char or burn temperature of the specific organic filler being used in the composite. In particular, wood fibers have been found to have a char temperature of between about 390 and 400 degrees Fahrenheit. Thus, in the preferred embodiment, the thermoplastic polymer has a melt temperature of less than 390 degrees Fahrenheit. As a result, the combination of materials comprising the composite material may be heated in order to melt the thermoplastic polymer without resulting in the charring or burning of the organic filler, which tends to detrimentally affect the filler and its physical properties.

The specific thermoplastic polymer selected is dependent upon, amongst other factors, the shape and chemical composition of the organic filler material, the particular thermoplastic polymer and the particular properties and characteristics of the coupling agent employed to promote the wetting and synergistic bonding of the filler and thermoplastic polymer into the composite material. However, the thermoplastic polymer is preferably of a high molecular weight. More particularly, the thermoplastic polymer is preferably a polyolefin. Further, as indicated above, the polyolefin is selected so that it has a melt temperature of less than 390 degrees Fahrenheit in the preferred embodiment to minimize the likelihood of charring of the filler upon heating of the composite material.

Further, in the preferred embodiment, the polyolefin is preferably one of polyethylene, polypropylene or polyvinyl chloride. Preferably, these preferred polyolefins are not mixed together or used in combination. However, the preferred polyolefins may be used in combination where technically feasible to do so and where the particular polyolefins are compatible for such purpose. For instance, polyethylene may be combined with polypropylene. Further, polyvinyl chloride may be combined with vinyl acetate polyethylene.

These preferred polyolefins tend to have a melt temperature of less than about 335 degrees Fahrenheit. Any polyethylene, polypropylene or polyvinyl chloride suitable for its intended use as described herein may be used. However, in the preferred embodiment, the polyethylene is a high density polyethylene having a Melt Flow Index (MFI) in the range of 0.4 to 0.6 and the polypropylene is a co-polymer with similar MFI. These higher molecular weight resins are preferable to effect a more positive entanglement with the wood fiber filler. Alternatively, an amorphous resin such as rigid polyvinyl chloride may be substituted for the polyethylene or polypropylene.

The preferable thermoplastic polymers and their typical physical properties are shown in Table No.'s 3, 4 and 5.

TABLE NO. 3

Description - THERMOPLASTIC POLYETHYLENE - Typical

| Technical Specifications (High Density) | Typical Value | Test Method |
| --- | --- | --- |
| Melting Temperature, ° F. (crystalline) | 257–272 | (125–133° C.) |
| Processing Temp. Range, ° F. (Extrusion) | 375–475 | (191–246° C.) |
| Coef. of Thermal Expansion (10-6 In/In/° C.) | 70 | ASTM D-696 |
| Thermal Conductivity (10-4 cal-cm/sec-cm2-° C.) | 10 | ASTM C-177 |
| Tensile Strength at Break, p.s.i. | 2500–4300 | ASTM D-638 |
| Elongation at Break, % | 170–800 | ASTM D-638 |
| Tensile Yield Strength, p.s.i. | 2800–3900 | ASTM D-638 |
| Tensile Modulus, 103 p.s.i. | 136 | ASTM D-638 |
| Flexural Modulus, 103 p.s.i. at 73° F. | 125–175 | ASTM D-790 |
| Izod Impact, ft. lb./in. of notch (⅛" thick Spec.) | 3.2–4.5 | ATSM D256A |
| Hardness, Shore | D63–65 | ATSM D-2240 |
| Water Absorption, % (24 Hr Immersion) | <0.01 | ASTM D-570 |
| Specific Gravity, 20° C. (g/cc) | 0.947–0.955 | ASTM D-792 |

TABLE NO. 4

Description - THERMOPLASTIC POLYETHYLENE - Typical

| Technical Specifications (Copolymer) | Typical Value | Test Method |
| --- | --- | --- |
| Melting Temperature, ° F. (crystalline) | 320–335 | (160–168° C.) |
| Processing Temp. Range, ° F. (Extrusion) | 400–500 | (205–260° C.) |
| Coef. of Thermal Expansion (10-6 In/In/° C.) | 68–95 | ASTM D-696 |
| Thermal Conductivity (10-4 cal-cm/sec-cm2-° C.) | 3.5–4.0 | ASTM C-177 |
| Tensile Strength at Break, p.s.i. | 4000–5500 | ASTM D-638 |
| Elongation at Break, % | 200–700 | ASTM D-638 |
| Tensile Yield Strength, p.s.i. | 3500–4300 | ASTM D-638 |
| Tensile Modulus, 103 p.s.i. | 100–170 | ASTM D-638 |
| Flexural Modulus, 103 p.s.i. at 73° F. | 130–200 | ASTM D-790 |
| Izod Impact, ft. lb./in. of notch (⅛" thick Spec.) | 1.0–20.0 | ATSM D256A |
| Hardness, Rockwell | R50–96 | ATSM D-2240 |
| Water Absorption, % (24 Hr Immersion) | 0.03 | ASTM D-570 |
| Specific Gravity, 20° C. (g/cc) | 0.890–0.905 | ASTM D-792 |

TABLE NO. 5

Description - THERMOPLASTIC POLYVINYL CHLORIDE - Typical

| Technical Specifications (Copolymer) | Typical Value | Test Method |
| --- | --- | --- |
| Melting Temperature, ° F. (amorphous) | 167–221 | (75–105° C.) |
| Processing Temp. Range, ° F. (Extrusion) | 300–415 | (148–213° C.) |
| Coef. of Thermal Expansion (10-6 In/In/° C.) | 50–100 | ASTM D-696 |
| Thermal Conductivity (10-4 cal-cm/sec-cm2-° C.) | 3.5–5.0 | ASTM C-177 |
| Tensile Strength at Break, p.s.i. | 6000–7500 | ASTM D-638 |
| Elongation at Break, % | 40–80 | ASTM D-638 |
| Compressive Strength, p.s.i. | 10,000–16,000 | ASTM D-638 |
| Tensile Modulus, 103 p.s.i. | 350–600 | ASTM D-638 |
| Flexural Modulus, 103 p.s.i. at 73° F. | 300–500 | ASTM D-790 |
| Izod Impact, ft. lb./in. of notch (⅛" thick Spec.) | 0.4–20.0 | ATSM D256A |
| Hardness, Shore | D65–85 | ATSM D-2240 |
| Water Absorption, % (24 Hr Immersion) | 0.04–0.40 | ASTM D-570 |
| Specific Gravity, 20° C. (g/cc) | 1.30–1.58 | ASTM D-792 |

The relative proportions of the organic filler and the thermoplastic polymer may vary, but are also dependent upon, amongst other factors, the shape and chemical composition of the filler material, the particular thermoplastic polymer and the particular properties and characteristics of the coupling agent employed to promote the wetting and synergistic bonding of the filler and thermoplastic polymer into the composite material. However, in the preferred embodiment, the thermoplastic polymer comprises between about 30 to 75 percent by weight of the composite material.

The thermoplastic polymer may be used in any suitable form compatible with the process for the production of the composite material. However, the thermoplastic polymer is preferably of a powdered or micropellet form. This form of the thermoplastic polymer is also compatible with the further processing of the composite material by extrusion as it facilitates a more rapid melt fluxing during the limited time frame of high output rate product extrusion processing conditions.

The coupling agent is selected to facilitate good dispersion and a more even distribution of the filler and the thermoplastic polymer in the composite material and to enhance bonding or adhesion therebetween. Dispersion refers to the degree of mixing in a colloidal system. Good dispersion corresponds to colloid ally stable individual particles. Poor dispersion corresponds to an agglomerated filler.

The coupling agent of the within invention is comprised of at least one high molecular weight fatty acid having at least 16 carbon atoms and at least one high molecular weight rosin acid having at least 16 carbon atoms. Each of the fatty acids and the rosin acids performs the functions and has the properties discussed further below. The coupling agent may be comprised of any suitable percentages by weight of the fatty acids and rosin acids capable of performing the function of the coupling agent. However, preferably, the coupling agent is comprised of between about 10 to 55 percent by weight of the fatty acids and of between about 5 to 50 percent by weight of the rosin acids. In the preferred embodiment, the coupling agent is comprised of between about 35 to 55 percent by weight of the fatty acids and of between about 25 to 50 percent by weight of the rosin acids.

Further, the coupling agent may be comprised of any percentage by weight of unsaponifiables, as described below, which does not significantly interfere with the functioning of the coupling agent. However, preferably, the coupling agent is comprised of less than about 40 percent by weight of unsaponifiables. In the preferred embodiment, the coupling agent is comprised of less than about 20 percent by weight.

In the preferred embodiment, the coupling agent is comprised of tall oil. Tall oil is a by-product of the kraft or sulfate pulping process. In the kraft or sulfate pulping process, fatty acids and rosin acids, occurring in pine wood as free acids or their esters, are saponified to their corresponding sodium salts by a cooking liquor. The salts, as well as some neutral materials referred to as unsaponifiables are dissolved or suspended in the cooking liquor. The American Society for Testing Materials (ASTM) defines tall oil as a "generic name for a number of products obtained from the manufacture of wood pulp by the alkali (sulfate) process, more popularly known as the kraft process." Thus, as described further below, tall oil is a mixture of fatty acids, rosin acids and unsaponifiables. However, although the tall oil is preferably "naturally" produced by the process described above, the tall oil may also be synthetically produced for use in the within invention.

The acid number of the tall oil (mg KOH/g sample) is typically used as a criterion of quality. The higher the acid number, the greater the quantity of the free rosin acids and fatty acids which are available, and thus recoverable. Thus, the acid number of the tall oil also determines the functionality of the tall oil acting as a coupling or wetting agent of the wood fiber filler and affects the attractive bonding of the wood fiber filler and the thermoplastic polymer. In other words, the greater the acid number of the tall oil, the more effective the tall oil tends to be in acting as, and performing the functions of, a coupling agent. In the within invention, the tall oil preferably has an acid number of greater than about 100. In the preferred embodiment, the acid number of the tall oil is between about 100 and 175. However, any acid number of the tall oil, and any quantity of rosin and fatty acids therein, sufficient for the tall oil to perform its intended coupling or compatibility function may be used.

It is believed that the tall oil used as the coupling agent in the present invention acts as either, or both, a wetting additive and chemical coupling agent for the wood fiber filler particles in the matrix. As the dimensional size of the filler particles for use in the composite material decreases, the more difficult the task of dispersing the particles in the thermoplastic polymer tends to become. The tall oil is believed to surround or wet the individual filler particles as the composite is prepared. As a result, the hydrophilic filler particles and the hydrophobic thermoplastic polymer are rendered more compatible and wetting of the filler particles by the thermoplastic polymer is enhanced or facilitated. Wetting is defined as the extent to which a liquid makes contact with a surface. Thus, the tall oil tends to facilitate the dispersion of the filler particles within the thermoplastic polymer, thus contributing to the more even distribution of the components throughout the composite material. For instance, the tall oil has been found to improve the dispersion of the filler particles in the thermoplastic polymer melt upon extrusion.

As stated, in addition to facilitating the wetting of the filler particles by the thermoplastic polymer, the tall oil may facilitate or enhance a chemical reaction between the thermoplastic polymer and the filler. Specifically, the tall oil may cause or contribute to the formation of relatively strong bonds between the thermoplastic polymer and the filler particles. As a result, the composites have been found to have an increased affinity or adhesion between the filler particles and the thermoplastic polymer.

It is therefore believed that the effectiveness of tall oil as a coupling agent may be related to its ability to penetrate the wood fibers and to form a strongly held hydrophobic wetted surface layer that is attractive to the thermoplastic polymer, thereby tending to increase both the effective bonding area and the encapsulation of the filler particles and to chemically and physically interlock the components into the new composite material.

Finally, it has been found that the use of tall oil as the coupling agent tends to improve the extrusion processability of the composite material. The tall oil tends to act as a lubricant to the solid state component particulates and to enhance the conveying of the solids mix in the extruder screw channels to effect a more even mixing and maximum heat exposure with the extruder barrel walls to complete the synergistic melt fluxing of the components into the composite material.

As stated, tall oil is a mixture of fatty acids, rosin acids and unsaponifiables. The chemistry of tall oil tends to be complex because both the rosin and fatty acid fractions contain numerous individual compounds. However, details of the chemistry can be simplified by grouping similar compounds and by taking into consideration the fact that all of the fatty and resin acids contain the carboxylic acid group and the bulk of them contain double bonds.

The fatty acids present in tall oil are high molecular weight fatty acids. More particularly, the fatty acids are comprised primarily of $C_{18}$ (18 carbon atoms) linear saturated and unsaturated chains with minor amounts of $C_{16}$ chains. The tall oil tends to include more than ten different fatty acids of different molecular size, both saturated and unsaturated. The most common fatty acids found in tall oil are palmitic and stearic acids, which are saturated, and oleic and linoleic acids, which are unsaturated. The typical composition of these fatty acids are presented in Table No. 6. In addition to fatty acids, the fatty acid fraction of the tall oil typically contains 1–2% neutrals or unsaponifiables and 1–2% rosin acids.

TABLE NO. 6

MAJOR TALL OIL FATTY ACIDS CHEMISTRY

| | | |
|---|---|---|
| Oleic Acid | 50% | CH3(CH2)7COOH=CH(CH2)7COOH |
| Linoleic Acid, Non-conjugated | 40% | CH3(CH2)4CH=CHCH2CH=CH(CH2)7 COOH |
| Linoleic Acid, Conjugated | 5% | Several isomers present |
| Stearic Acid | 2% | CH3(CH2)16COOH |
| Palmitic Acid | 0.1% | CH3(CH2)14COOH |

It is believed that the fatty acids of the tall oil act primarily as a surfactant to enhance the compatibility of the filler particles and the thermoplastic polymer, as described above. Thus, the fatty acids are believed to facilitate the dispersion and even distribution of the filler particles throughout the thermoplastic polymer.

Figure 4:
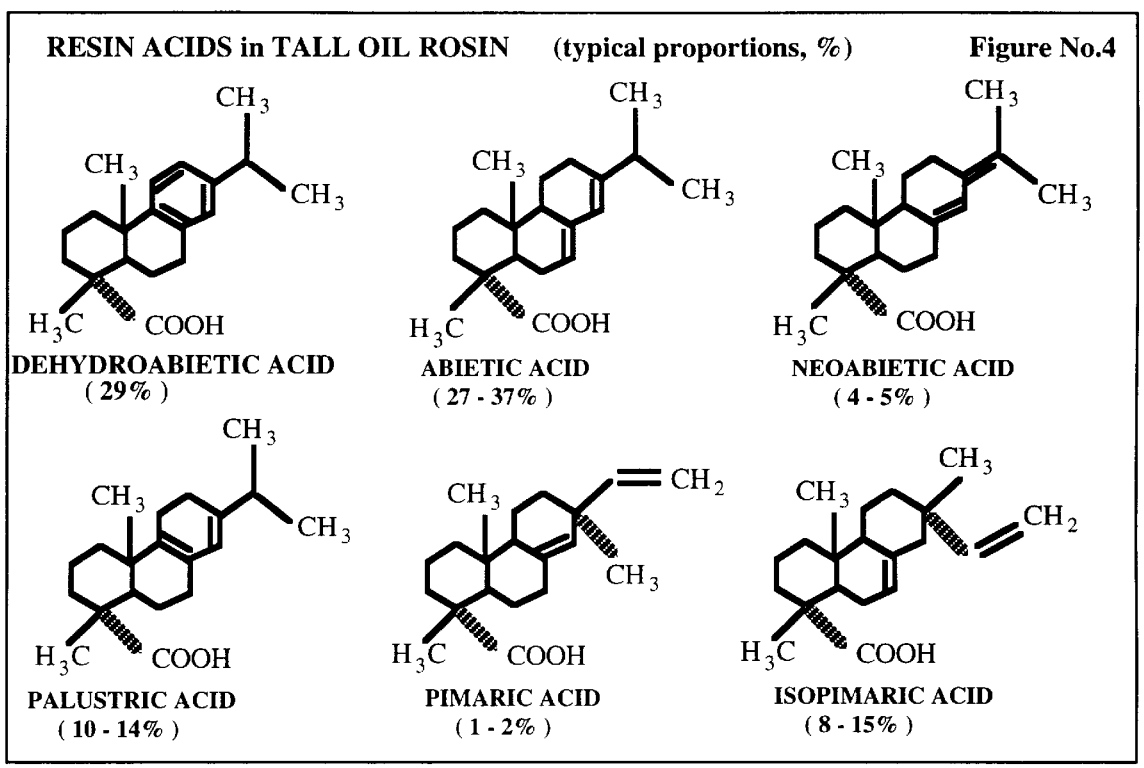
FIG. 4 is a schematic illustration of the tall oil rosin acids chemistry.

The rosin acids present in tall oil are also of a high molecular weight, comprised primarily of $C_{16}$ (16 carbon atoms) and greater. Rosin acids occur in tall oil in a number of isomeric forms, nearly all of which have the same basic skeleton: a three-ring fused system with the empirical formula $C_{20}H_{30}O_2$. The most common rosin acids are abietic-type acids, such as levopimaric, palustric, abietic and neoabietic acids, and pimaric-type acids, such as pimaric and isopimaric acids. Some of these rosin acids are shown in FIG. 4. Many other rosin acids may also be included in lesser amounts. The rosin acid fraction of the tall oil may also contain up to 3% fatty acids and 3–4% neutrals or unsaponifiables.

It is believed that the rosin acids of the tall oil act primarily as a tackifier to enhance the bonding or adhesion of the filler particles with the thermoplastic polymer, as described above. It is further believed that the rosin acids act to soften or dissolve a the thermoplastic polymer such that the polymer is able to bond with the filler particles.

The final primary component of tall oil is neutral materials or unsaponifiables. The unsaponifiables typically include high molecular weight fatty alcohols, esters, plant sterols, hydrocarbons and beta-sitosterol. In the preferred embodiment, the tall oil is depitched. Depitching of the tall oil involves the removal of a portion of the pitch and the more volatile unsaponifiables. These components tend to result in a lower quality tall oil and therefore are preferably removed from the tall oil. Depitched tall oil is a product obtained from the distillation of crude tall oil in a fractionating process.

An example of a commercial grade of depitched tall oil acceptable for use in the within invention is produced by B.C. Chemicals Limited, Prince George, B.C., Canada. The depitched tall oil contains reduced contents of unsaponifiables, as described in Table No. 7.

TABLE NO. 7

Description - DEPITCHED TALL OIL

| Technical Specifications | Typical Value | Test Method |
| --- | --- | --- |
| ACID NUMBER | 154 | ASTM D-803 |
| FATTY ACIDS, % | 45 | ASTM D-803 |
| ROSIN ACIDS, % | 35 | ASTM D-803 |
| UNSAPONIFIABLES, % | 15 | ASTM D-803 |
| ASH, % | trace | ASTM D-803 |
| MOISTURE, % | trace | ASTM D-803 |
| VISCOSITY, 60° C., cSt | 26 | ASTM D-2170 |
| VISCOSITY, 100° C., cSt | 8 | ASTM D-2170 |
| FLASH POINT, ° C. (Pensky - Martens Closed Cup) | 185 | ASTM D-93 |
| SPECIFIC GRAVITY, 200 C. | 0.97 | |

The chemical composition of the tall oil and the percentage of fatty acids, rosin acids and unsaponifiables therein tends to vary with the geographical location and with the species of trees used in pulping. However, preferably, in the within invention, as described above, the tall oil is comprised of between about 10 to 55 percent by weight of the fatty acids, between about 5 to 50 percent by weight of the rosin acids and less than about 40 percent by weight of unsaponifiables. In the preferred embodiment utilizing depitched tall oil, the depitched tall oil is preferably comprised of between about 35 to 55 percent by weight of the fatty acids, between about 25 to 50 percent by weight of the rosin acids and less than about 20 percent by weight of unsaponifiables.

Any effective amount of coupling agent sufficient for performing its intended functions as described herein may be used. Further, the amount of the coupling agent used will vary depending upon the desired properties of the composite material. Thus, the amount of the coupling agent for use in the present invention may vary over wide limits. In addition, the preferred proportional amount of the coupling agent is determined by, amongst other factors, the quantity and type of the thermoplastic polymer used and the composition of the filler.

Preferably when using depitched tall oil as the coupling agent, the proportion of coupling agent added is between about 0.5 to 10% by weight, based upon the weight of the treated wood fiber filler. In the preferred embodiment, the composite material is comprised of an amount of the coupling agent of between about 0.5 to 5 percent by weight of the organic filler.

Finally, where appropriate for the particular intended use of the composite material and its desired properties, the composite material may be further comprised of appropriate additional components. For instance, the composite material may be further comprised of antioxidants or inhibitors to enhance the stability of the resultant product.

The present invention is also directed at a process for producing the composite material as described above. The process may be comprised of a single combining step performed at a specific temperature. Specifically, the organic filler, the thermoplastic polymer and the coupling agent are measured or proportioned and then combined together at a temperature of greater than or equal to the melt temperature of the thermoplastic polymer and less than the char temperature of the organic filler, so that the thermoplastic polymer reaches a fluxed state condition. Any suitable apparatus, device or process for combining the components of the composite material at the required temperature may be used. However, preferably a high intensity blender is used.

Preferably, the processing conditions, including the processing temperature, time and manner of combining the components are selected such that the combining step results in a substantially uniform or homogeneous composite material, without resulting in any significant thermal or mechanical degradation of the organic filler or the thermoplastic polymer. Thus, a high shear agitation is preferably used to combine the components of the composite material.

Although the components may be combined and mixed together in a single step to produce the composite material, the combining step preferably comprises a first mixing step and a second mixing step. The first mixing step is comprised of mixing the organic filler with the coupling agent such that the coupling agent substantially wets the organic filler to produce a wetted filler. The second mixing step is comprised of mixing the thermoplastic polymer with the wetted filler such that the thermoplastic polymer is substantially homogeneously blended with the wetted filler to produce the composite material.

The organic filler is prepared for use in the composite material, where necessary, by sizing and drying it or taking other steps to achieve other desired specifications or properties. The filler may be so prepared for use using methods, apparatuses and devices known in the industry.

The coupling agent is then added to the organic filler at the desired proportion or percentage and the filler-coupling agent mixture is mixed such that the coupling agent substantially wets the organic filler. Any suitable apparatus, device or process for mixing these components may be used. However, preferably a high intensity blender, providing a high shear agitation, is used. It has been found that given that the tall oil is in a liquid state form, it may be readily mixed with the particulate wood fibers upon intensive blending or mixing.

The mixing step may be performed for any period of time sufficient to achieve the desired degree of mixing between the organic filler and the coupling agent. More particularly, the mixing step is performed for a period of time sufficient to achieve a substantial wetting of the organic filler by the coupling agent such that the coupling agent is able to perform its purpose or function as described herein. In the preferred embodiment, the tall oil and the treated wood fiber filler are intensively blended for a period of between about 3 and 15 minutes.

In addition, in the preferred embodiment, in order to enhance the mixing of the filler and the coupling agent, the first mixing step is preferably performed at a sufficiently elevated temperature to achieve this purpose without significantly damaging the filler particles. Specifically, the filler-coupling agent mixture are preferably heated during the first mixing step to a temperature of between about 150 and 200 degrees Fahrenheit. However, higher temperatures may be used as long as the temperature is less than the char temperature of the filler. Alternately, heating of the mixture during the first mixing step may not be required where sufficient wetting of the filler is achievable without it. The wetted filler produced by the first mixing step is then preferably cooled to ambient temperature following completion of the first mixing step.

The thermoplastic polymer is preferably prepared for use in the process, such as by the addition of pigments or stabilizers, in a manner known in the industry. The prepared thermoplastic polymer is subsequently added to the wetted filler and the thermoplastic polymer is mixed with the wetted filler, while being heated, in a manner such that the thermoplastic polymer is substantially homogeneously blended with the wetted filler to produce the composite material.

Specifically, the thermoplastic polymer and wetted filler are heated during the second mixing step to a temperature of greater than or equal to the melt temperature of the thermoplastic polymer and less than the char temperature of the organic filler, so that the thermoplastic polymer reaches a fluxed state condition. In the preferred embodiment, the second mixing step is performed at a temperature of less than 390 degrees Fahrenheit, and more preferably, at a temperature of between about 300 and 375 degrees Fahrenheit. Any suitable apparatus, device or process for mixing these components at the desired temperature may be used. However, preferably a high intensity blender, providing a high shear agitation, is used.

The second mixing step may be performed for any period of time sufficient to achieve the desired degree of blending between the filler and the thermoplastic polymer. Although the desired degree of blending may vary depending upon the desired properties of the composite material, the blending step is preferably performed for a period of time sufficient to substantially homogeneously mix the components to produce a substantially homogeneous composite material. Referring to FIG. 2, in the preferred embodiment, the wood fiber filler particles are believed to be encapsulated by the thermoplastic polymer into a substantially homogenous matrix by the wetting action of the depitched tall oil.

The composite material is then preferably heat processed into the desired end product, such as by molding or extrusion. It has been found that the composite material of the within invention tends to have relatively good extrusion processing characteristics as compared to conventional composites, including improved continuous extrusion of the composite material and enhanced accommodating processing and physical properties.

Although the combining and the extruding steps may be performed separately in different processing equipment, alternately, an extruder may be used to perform both of these steps. Specifically, the components of the composite material may be combined together at the desired temperature within the extruder and subsequently extruded. For instance, the components may be flux melted by the extruder at a temperature of less than 390 degrees Fahrenheit, or at a temperature of between about 300 and 375 degrees Fahrenheit. For this purpose, any suitable plasticizing extruder may be used. However, preferably, the extruder is a twin screw extruder apparatus having a variable rate drive means able to starve feed the composite material continuously into the feed hopper of the extruder.

In order to achieve desirable results from the extrusion process, the composite material should be uniformly heated/melted and well mixed prior to extrusion. Proper melting and mixing requires that the correct screw is used and that sufficient back pressure is present in the barrel to enable optimum fluxing and thermal uniformity. In the preferred embodiment, the extrusion preferably occurs at a back pressure range of between 500 and 2000 psi. Further, a vacuum is preferably applied to the extruder such that volatiles and moisture may be drawn off. Preferably, the negative pressure of the vacuum is in the range of between about 10 to 25 inches of Hg.

A die mounting head and shaping die are affixed to the extruder barrel exit so that the desired end product may be formed. In addition, the extruded product may undergo further conventional processing steps to produce either a flat sheet or profile shape product.

End uses for the new composite material are varied with a primary application as a raw material infeed for extrusion conversion into flat sheets and panelboards. The composite material may also be extruded into dimensional profile shapes for the building products industry. The new composite material provides an alternative or replacement for conventional solid plastics, wood fiber-thermoset composites and milled generic wood dimensional mouldings and trims such as are used in the construction, window and door, cabinetry and furniture fabrication industries.

It has been found that not only are the physical properties of tensile strength and elastic modulus improved but also the durability properties of the composite material. As well, products produced from the composite material tend to have an aesthetically pleasing appearance with smooth surfaces and minimum distortion. Furthermore, the production composite material scrap and trims can be reground and re-extruded to yield a product exhibiting little, if any, deterioration in physical properties.

EXAMPLES

The invention is further illustrated in the following specific examples.

Where indicated in the examples, the source millwork moulding residues are a co-mingled fine particle wood fiber-thermoset mixture (medium density fiberboard, manufactured by Ranger), obtained from Dartree Group Inc., Edmonton, Alberta, Canada. The source plywood trim and scrap residues are a co-mingled long wood fiber-thermoset mixture (Construction Plywood manufactured by Zeidler) obtained from Zeidler Forest Industries Ltd., also of Edmonton, Alberta, Canada. The thermoplastic polymers used are as illustrated in Tables No. 3, 4 and 5. The Examples are as follows:

Example 1

Typical thermoplastic polymers—control component (no filler);

Example 2

Generic organic (untreated) wood fiber and thermoplastic polymer;

Example 3

Generic organic (untreated) wood fiber, thermoplastic polymer and depitched tall oil;

Example 4

Co-mingled wood fiber-thermoset mixture (treated) and thermoplastic polymer; and

Example 5

Co-mingled wood fiber-thermoset mixture (treated), thermoplastic polymer and depitched tall oil.

Example No. 1 is the basic control thermoplastic polymer providing the base datum for comparison of properties and improvements in a variety of new wood-polymer composites as shown in Examples No. 2 through 5, as provided by the within invention.

Example No. 2 contains no depitched tall oil component or other extrusion process additives or colorants. This example contains a virgin natural generic wood fiber sawdust without any thermoset binding components and is referred to as being "untreated", with grade 4020 specifications and properties as shown previously in the Table No's 1 and 2.

Example No. 2
GENERIC WOOD and THERMOPLASTIC POLYMER
Formulation for Typical Blend for Evaluation Sample

| COMPONENT | Ref | Ratio per 100 Parts Sawdust | Weight per 100 Lb. Mix | Percent of Total Mix |
|---|---|---|---|---|
| Sawdust (40 U.S. Mesh) | a | 100 | 50 lbs | 50% |
| Thermoplastic Resin | b | 100 | 50 | 50% |
| Depitched Tall Oil | c | 0 | 0 | 0 |
| Other Additives | d | 0 | 0 | 0 |
| TOTAL, All Components | | 200 Parts | 100 Lbs. | 100% |

References for Example No. 2

(a) a generic spruce sawdust, untreated, particles screen sized to 40 US mesh, dried to 4% moisture content by weight.

(b) thermoplastic polymer—powder (c) depitched tall oil—none in this formulation.

(d) colorant/heat stabilizers—none in this formulation.

Example No. 3 is illustrated by the data shown in the table below. This example divulges a materials blend formulation and the results for comparison of properties and improvements against Example No. 2. This third example contains a proportional amount of depitched tall oil component at a ratio of 5% by weight, based on the weight of the virgin natural generic wood fiber sawdust without any thermoset binding components. The sawdust component is referred to as being "untreated", with grade 4020 specifications and properties as shown previously in the Table No's 1 and 2. This formulation contains no other extrusion process additives.

This example illustrates that addition of the depitched tall oil component may result in a marked improvement in extrusion processability and output gains with improved physical properties. The improved outputs may be attributable to the tall oil's lubrication and stabilization effect on the polymer melt and the improvement in extrusion fluxing of the materials with a consequent increase in the viscosity enabling a higher flow rate and reduced back pressure through the extruder die. Bonding of the sawdust filler to the thermoplastic polymer may also show improvement through the increases in strength and shear properties in this example.

Example No. 3
GENERIC WOOD, THERMOPLASTIC POLYMER, TALL OIL
Formulation for Typical Blend for Evaluation Sample

| COMPONENT | Ref | Ratio per 100 Parts Sawdust | Weight per 100 Lb. Mix | Percent of Total Mix |
|---|---|---|---|---|
| Sawdust (40 U.S. Mesh) | a | 100 | 50 Lbs | 50% |
| Thermoplastic Resin | b | 95 | 47.5 | 47.5% |
| Depitched Tall Oil | c | 5 | 2.5 | 2.5% |
| Other Additives | d | 0 | 0 | 0 |
| TOTAL, All Components | | 200 Parts | 100 Lbs. | 100% |

References for Example No. 3

(a) a generic spruce sawdust, untreated, particles screen sized to 40 US mesh, dried to 4% moisture content by weight.

(b) thermoplastic polymer—powder (c) depitched tall oil, BC chem. JC-30, acid no. 154.

(d) colorant/heat stabilizers—none in this formulation.

Example No. 4 contains no depitched tall oil component or other extrusion process additives or colorants. This example contains a waste wood fiber-thermoset bonded MDF particleboard moulding sawdust, pre-treated with the wood fiber content being adhesive and pressure bonded by a phenolic formaldehyde thermoset binding component. This filler component material is thus referred to as being "treated" and "co-mingled". The filler was sized to equivalent generic "un-treated" sawdust grade 4020 specifications as shown previously in the Table No. 1.

Example No. 4
Co-mingled Wood-Thermoset And Thermoplastic Polymer
Formulation for Typical Blend for Evaluation Sample

| COMPONENT | Ref | Ratio per 100 Parts Sawdust | Weight per 100 Lb. Mix | Percent of Total Mix |
|---|---|---|---|---|
| Co-mingled Wood (MFD) | a | 100 | 50 Lbs | 50% |
| Thermoplastic Resin | b | 100 | 50 | 50% |
| Depitched Tall Oil | c | 0 | 0 | 0 |
| Other Additives | d | 0 | 0 | 0 |
| TOTAL, All Components | | 200 Parts | 100 Lbs. | 100% |

References for Example No. 4 a) an MDF waste sawdust, (thermoset-bonded), particles screen sized to 40 US mesh, dried to 4% moisture content by weight. (Dartree-Ranger)

(b) thermoplastic polymer—powder (c) depitched tall oil, BC chem. JC-30, acid no. 154—none in this formulation.

(d) colorant/heat stabilizers—none in this formulation.

This embodiment of the invention illustrates that without the addition of the depitched tall oil, the results are marginally improved over Example No. 2 but less than that exhibited by Example No. 3 in extrusion processability and output gains, with some minimal physical properties improvement. The marginal improvement over Example No. 2 can be attributed to the improved bonding of the waste co-mingled sawdust-thermoset filler to the thermoplastic polymer due to this pre-treated filler having the phenolic thermoset fraction in this component. Some improvement in properties of Example No. 4 is thus attributed to the enhanced ability of the thermoplastic polymer to adhere and encapsulate the co-mingled fillers more thoroughly and thus provide limited increases in strength and shear properties of this version of the invention.

Example No. 5 contains a proportional amount of depitched tall oil at a ratio of 5% by weight, based on the weight of the waste wood fiber-thermoset bonded MDF particleboard moulding sawdust, pre-treated with the wood fiber content being adhesive and pressure bonded by a phenolic formaldehyde thermoset binding component. This filler component material is thus referred to as being "treated" and "co-mingled". The filler was sized to equivalent generic "un-treated" sawdust grade 4020 specifications as shown previously in the Table No. 1. This formulation contains no other extrusion process additives. Example No. 5 is illustrated by the data shown in the table below.

Example No. 5
Co-mingled Wood-Thermoset, Thermoplastic Polymer & Tall Oil
Formulation for Typical Blend for Evaluation Sample

| COMPONENT | Ref | Ratio per 100 Parts Sawdust | Weight per 100 Lb. Mix | Percent of Total Mix |
|---|---|---|---|---|
| Co-mingled Wood (MFD) | a | 100 | 50 Lbs | 50% |
| Thermoplastic Resin | b | 95 | 47.5 | 47.5% |
| Depitched Tall Oil | c | 5 | 2.5 | 2.5% |
| Other Additives | d | 0 | 0 | 0 |
| TOTAL, All Components | | 200 Parts | 100 Lbs. | 100% |

References for Example No. 5
 (a) an MDF waste sawdust, (thermoset-bonded), particles screen sized to 40 US mesh, dried to 4% moisture content by weight. (Dartree-Ranger)
 (b) thermoplastic polymer - powder
 (c) depitched tall oil, BC chem. JC-30, acid no. 154.
 (d) colorant/heat stabilizers—none in this formulation.

Example No. 5 illustrates that the addition of the depitched tall oil results in the most marked improvement in extrusion processability and output gains with improved physical properties over the previous examples. The improved outputs may be attributable to the tall oil's lubrication and stabilization effect on the polymer melt and the improvement in extrusion fluxing of the materials, with a consequent increase in the viscosity, enabling a higher flow rate and reduced back pressure through the extruder die.

The improvement over Example No. 3 may be attributable to the improved bonding of the waste co-mingled sawdust-thermoset filler to the thermoplastic polymer due to this pre-treated filler having the phenolic thermoset fraction in this component.

This improvement in properties of Example No. 5 may thus be attributed to the enhanced ability of the thermoplastic polymer to adhere and encapsulate the co-mingled fillers more thoroughly and thus provide limited increases in strength and shear properties of the composite of the within invention. The depitched tall oil, together with the co-mingled filler, appears to aid the thermoplastic polymer to effect a superior fluxed matrix phenomena that may show improvement over other examples, with the increases in strength and shear properties most pronounced.

Table No. 8 following summarizes the results of Examples No. 1 through 5. The table provides a comparative data base for each example analyzed. These examples have all been based on the use of the preferred thermoplastic polymers Polyethylene, Polypropylene and Polyvinyl Chloride. Similar results for other substitutable thermoplastic polymers are expected.

In all cases, it has been found that the use of the depitched tall oil has enhanced the performance of the extrusion fluxing of the materials, increasing output rate and the viscosity of the melt. The coupling of the wood fiber component to the thermoplastic polymer component has improved as indicated by the increase in strength and shear properties of the new composite material as shown by Examples 3 and 5.

The waste co-mingled sawdust-thermoset filler component is also shown to be superior to the generic wood fiber sawdust, as shown by Examples No. 4 and 5. The improvement of Example No. 5 over Example No. 4 may be attributable to the improved bonding of the waste co-mingled sawdust-thermoset filler to the thermoplastic polymer due to this pre-treated filler having the phenolic thermoset fraction in this component. This is also evident in the cases of the improvement of Example No. 3 over Example No. 2.

TABLE 8

SUMMARY of TEST EXAMPLES COMPARATIVE RESULTS

| | Base Polymer | | | | | | | | | | | | | | |
|---|---|---|---|---|---|---|---|---|---|---|---|---|---|---|---|
| | Polyethylene (PE) | | | | | Polypropylene (PP) | | | | | Polyvinyl Cloride (PVC) | | | | |
| | Example No. | | | | | | | | | | | | | | |
| COMPONENT | 1 | 2 | 3 | 4 | 5 | 1 | 2 | 3 | 4 | 5 | 1 | 2 | 3 | 4 | 5 |
| Wood - Generic Fiber (Untreated) | X | X | | | | X | X | | | | X | X | | | |
| Wood - Comingled MDF (Treated) | | | X | X | X | | | X | X | X | | | X | X | X |
| Thermoplastic Polymer | X | X | X | X | X | X | X | X | X | X | X | X | X | X | X |
| Additive (Coupling Agent) | | X | | X | | | X | | X | | | X | | X | |

TABLE 8-continued

SUMMARY of TEST EXAMPLES COMPARATIVE RESULTS

| | | Base Polymer | | | | | | | | | | | | | |
|---|---|---|---|---|---|---|---|---|---|---|---|---|---|---|---|
| | | Polyethylene (PE) | | | | | Polypropylene (PP) | | | | | Polyvinyl Cloride (PVC) | | | |
| | | Example No. | | | | | | | | | | | | | |
| | | 1 | 2 | 3 | 4 | 5 | 1 | 2 | 3 | 4 | 5 | 1 | 2 | 3 | 4 | 5 |
| PROPERTIES | ASTM Test No. | | | | | | | | | | | | | | | |
| Flexural Modulus (GPa) | D-790 | 5.0 | 7.5 | 17.0 | 15.0 | 20.0 | 15.0 | 18.0 | 42.0 | 40.0 | 45.0 | 19.0 | 18.5 | 21.5 | 18.0 | 23.0 |
| (PSI × 1000) | | 7.25 | 10.88 | 24.65 | 21.75 | 29.00 | 21.68 | 26.10 | 60.90 | 58.00 | 65.25 | 27.55 | 26.83 | 31.18 | 26.10 | 33.35 |
| Tensile Strength (MPa) | D-638 | 15.0 | 16.5 | 23.0 | 22.0 | 24.0 | 32.0 | 33.0 | 39.0 | 35.0 | 45.0 | 35.0 | 30.0 | 34.0 | 32.0 | 36.0 |
| (PSI × 1000) | | 2.18 | 2.39 | 3.34 | 3.19 | 3.48 | 4.64 | 4.79 | 5.66 | 5.08 | 6.53 | 5.08 | 4.35 | 4.93 | 4.64 | 5.22 |
| Tensile Modulus (GPa) | D-638 | 4.0 | 5.0 | 7.5 | 7.0 | 9.0 | 12.0 | 20.0 | 29.5 | 28.0 | 30.0 | 31.0 | 29.0 | 28.5 | 26.0 | 30.0 |
| (PSI × 1000) | | 5.80 | 7.25 | 10.88 | 10.15 | 13.05 | 17.40 | 29.00 | 42.78 | 40.60 | 43.50 | 44.95 | 42.05 | 41.33 | 37.70 | 43.50 |

↑ Polymer Control Sample    ↑ Polymer Control Sample    ↑ Polymer Control Sample 1 MPa = 145 PSI
1 GPa = 1450 PSI The embodiments of the invention in which an exclusive property or privilege is claimed are defined as follows:

1. A composite material comprising a product of a combination of materials, the combination of materials comprising:
   (a) an organic filler comprised of cellulosic material;
   (b) a thermoplastic polymer having a melt temperature of less than the char temperature of the organic filler; and
   (c) a coupling agent comprised of at least one fatty acid having at least 16 carbon atoms and at least one rosin acid having at least 16 carbon atoms.

2. The composite material as claimed in claim 1 wherein the coupling agent is comprised of between about 10 to 55 percent by weight of the fatty acids and of between about 5 to 50 percent by weight of the rosin acids.

3. The composite material as claimed in claim 2 wherein the coupling agent is comprised of between about 35 to 55 percent by weight of the fatty acids and of between about 25 to 50 percent by weight of the rosin acids.

4. The composite material as claimed in claim 3 wherein the coupling agent is comprised of less than about 40 percent by weight of unsaponifiables.

5. The composite material as claimed in claim 4 wherein the coupling agent is comprised of less than about 20 percent by weight of unsaponifiables.

6. The composite material as claimed in claim 5 wherein the coupling agent is comprised of a tall oil.

7. The composite material as claimed in claim 6 wherein the combination of materials is comprised of the coupling agent in an amount of between about 0.5 to 10 percent by weight of the organic filler.

8. The composite material as claimed in claim 7 wherein the combination of materials is comprised of the coupling agent in an amount of between about 0.5 to 5 percent by weight of the organic filler.

9. The composite material as claimed in claim 6 wherein the organic filler is comprised of wood fibers.

10. The composite material as claimed in claim 9 wherein the organic filler is comprised of co-mingled wood fibers and a thermoset binding polymer.

11. The composite material as claimed in claim 10 wherein the organic filler has a particle size of less than or equal to about 40 mesh.

12. The composite material as claimed in claim 10 wherein the moisture content of the organic filler is between about 2 and 6 percent by weight.

13. The composite material as claimed in claim 10 wherein the organic filler comprises between about 10 and 80 percent by weight of the composite material.

14. The composite material as claimed in claim 13 wherein the organic filler comprises between about 25 and 70 percent by weight of the composite material.

15. The composite material as claimed in claim 10 wherein the thermoplastic polymer is comprised of a polyolefin having a melt temperature of less than about 390 degrees Fahrenheit.

16. The composite material as claimed in claim 15 wherein the polyolefin is selected from the group consisting of polyethylene, polypropylene and polyvinyl chloride.

17. The composite material as claimed in claim 16 wherein the thermoplastic polymer comprises between about 30 and 75 percent by weight of the composite material.

18. A process for producing a composite material comprising the step of combining an organic filler comprised of cellulosic material, a thermoplastic polymer having a melt temperature of less than the char temperature of the organic filler and a coupling agent comprised of at least one fatty acid having at least 16 carbon atoms and at least one rosin acid having at least 16 carbon atoms, wherein the combining step is performed at a temperature of greater than or equal to the melt temperature of the thermoplastic polymer and less than the char temperature of the organic filler.

19. The process as claimed in claim 18 wherein the combining step is comprised of the steps of:
   (a) first mixing the organic filler with the coupling agent such that the coupling agent substantially wets the organic filler to produce a wetted filler;
   (b) second mixing the thermoplastic polymer with the wetted filler such that the thermoplastic polymer is substantially homogeneously blended with the wetted filler to produce the composite material.

20. The process as claimed in claim 19 wherein the coupling agent is comprised of between about 10 to 55 percent by weight of the fatty acids and of between about 5 to 50 percent by weight of the rosin acids.

21. The process as claimed in claim 20 wherein the coupling agent is comprised of less than about 40 percent by weight of unsaponifiables.

22. The process as claimed in claim 21 wherein the coupling agent is comprised of a tall oil.

23. The process as claimed in claim 22 wherein the first mixing step is comprised of mixing an amount of the coupling agent of between about 0.5 to 10 percent by weight of the filler.

24. The process as claimed in claim 22 wherein the filler is comprised of wood fibers.

25. The process as claimed in claim 24 wherein the filler is comprised of co-mingled wood fibers and a thermoset binding polymer.

26. The process as claimed in claim 25 wherein the first mixing step is comprised of mixing an amount of the organic filler of between about 10 and 80 percent by weight of the composite material.

27. The process as claimed in claim 25 wherein the thermoplastic polymer is comprised of a polyolefin having a melt temperature of less than about 390 degrees Fahrenheit.

28. The process as claimed in claim 27 wherein the polyolefin is selected from the group consisting of polyethylene, polypropylene and polyvinyl chloride.

29. The process as claimed in claim 28 wherein the second mixing step is comprised of mixing an amount of the thermoplastic polymer of between about 30 and 75 percent by weight of the composite material.

30. The process as claimed in claim 28 further comprising the step of extruding the composite material at a temperature of less than 390 degrees Fahrenheit.

* * * * *